United States Patent
Pinault et al.

(10) Patent No.: US 9,258,430 B2
(45) Date of Patent: Feb. 9, 2016

(54) METHOD FOR DYNAMICALLY PROVIDING A TERMINAL CONNECTED TO A PUBLIC COMMUNICATION NETWORK, WITH SERVICES OFFERED BY A PRIVATE TELECOMMUNICATION NETWORK

(75) Inventors: Francis Pinault, Bois-Colombes (FR); Jean-Louis Boulet, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1721 days.

(21) Appl. No.: 10/517,369

(22) PCT Filed: Jun. 13, 2003

(86) PCT No.: PCT/FR03/01779
§ 371 (c)(1),
(2), (4) Date: Dec. 10, 2004

(87) PCT Pub. No.: WO03/107645
PCT Pub. Date: Dec. 24, 2003

(65) Prior Publication Data
US 2005/0249146 A1   Nov. 10, 2005

(30) Foreign Application Priority Data
Jun. 13, 2002 (FR) ...................... 02 07271

(51) Int. Cl.
*G06F 15/16* (2006.01)
*H04M 7/00* (2006.01)
(Continued)

(52) U.S. Cl.
CPC .............. *H04M 7/0009* (2013.01); *H04M 3/42* (2013.01); *H04M 3/42178* (2013.01); *H04M 2203/053* (2013.01); *H04M 2203/257* (2013.01); *H04M 2207/18* (2013.01); *H04W 76/02* (2013.01)

(58) Field of Classification Search
CPC . H04L 67/04; H04L 65/1069; H04L 65/1073; H04L 67/306; H04L 63/02; H04L 12/66; H04L 63/10; H04W 76/02; H04W 4/00; H04W 12/06; H04W 60/00; H04W 84/16; H04M 7/0003
USPC ........... 709/230, 218, 227; 370/328, 338, 349
See application file for complete search history.

(56) References Cited

U.S. PATENT DOCUMENTS 5,375,244 A * 12/1994 McNair ......................... 710/200
5,490,251 A * 2/1996 Clark et al. ................... 709/237
5,625,677 A * 4/1997 Feiertag et al. ............... 370/493

(Continued)

FOREIGN PATENT DOCUMENTS

WO   WO 0215501 A   2/2002

*Primary Examiner* — Oleg Survillo
(74) *Attorney, Agent, or Firm* — Chiesa Shahinian & Giantomasi PC (57) ABSTRACT

A communication server enabling the provision of services offered by a second private communication network to terminals connected to a first communication network. The terminals are capable of simultaneously exchanging signaling data on a first transmission channel and voice data on a second transmission channel, in accordance with a selected protocol. The server is capable of transmitting configuration data to a terminal connected to the first network over the first channel and in accordance with a selected criterion. The configuration data is designed to enable a connection with the server to be set up on the first channel by the terminal, during a voice link on the second channel, so as to provide the terminal, during the voice link, with services offered by the second network.

20 Claims, 6 Drawing Sheets

FIG.1

(51) Int. Cl.
*H04M 3/42* (2006.01)
*H04W 76/02* (2009.01)

(56) References Cited

U.S. PATENT DOCUMENTS

| | | | |
|---|---|---|---|
| 5,867,562 A * | 2/1999 | Scherer | 379/88.21 |
| 6,023,762 A * | 2/2000 | Dean et al. | 713/193 |
| 6,112,084 A * | 8/2000 | Sicher et al. | 370/337 |
| 6,226,623 B1 * | 5/2001 | Schein et al. | 705/35 |
| 6,311,060 B1 * | 10/2001 | Evans et al. | 455/426.1 |
| 6,324,579 B1 * | 11/2001 | Bleuse et al. | 709/227 |
| 6,389,039 B1 * | 5/2002 | Katinakis et al. | 370/474 |
| 6,456,709 B1 * | 9/2002 | Cox et al. | 379/218.01 |
| 6,766,454 B1 * | 7/2004 | Riggins | 713/185 |
| 6,788,667 B1 * | 9/2004 | Beresin | 370/338 |
| 6,876,858 B1 * | 4/2005 | Duvall et al. | 455/456.1 |
| 6,920,209 B1 * | 7/2005 | Gainsboro | 379/188 |
| 7,027,809 B1 * | 4/2006 | Smith et al. | 455/423 |
| 7,266,104 B2 * | 9/2007 | Belcea | 370/338 |
| 7,369,529 B2 * | 5/2008 | Hsu et al. | 370/338 |
| 7,492,873 B2 * | 2/2009 | Giroti et al. | 379/88.17 |
| 2002/0039904 A1 * | 4/2002 | Anderson | 455/456 |
| 2002/0075844 A1 * | 6/2002 | Hagen | 370/351 |
| 2002/0128003 A1 * | 9/2002 | Gruner et al. | 455/422 |
| 2002/0136173 A1 * | 9/2002 | Monroe et al. | 370/328 |
| 2002/0138622 A1 * | 9/2002 | Dorenbosch et al. | 709/227 |
| 2002/0188725 A1 * | 12/2002 | Mani | 709/227 |
| 2002/0191557 A1 * | 12/2002 | Chow et al. | 370/329 |
| 2003/0014488 A1 * | 1/2003 | Dalal et al. | 709/204 |
| 2003/0110268 A1 * | 6/2003 | Kermarec et al. | 709/227 |
| 2003/0156578 A1 * | 8/2003 | Bergenlid et al. | 370/352 |
| 2004/0073674 A1 * | 4/2004 | Vergnaud et al. | 709/226 |
| 2004/0215711 A1 * | 10/2004 | Martin et al. | 709/203 |
| 2009/0203357 A1 * | 8/2009 | Harris et al. | 455/412.1 |
| 2009/0325540 A1 * | 12/2009 | Yach et al. | 455/405 |

* cited by examiner

METHOD FOR DYNAMICALLY PROVIDING A TERMINAL CONNECTED TO A PUBLIC COMMUNICATION NETWORK, WITH SERVICES OFFERED BY A PRIVATE TELECOMMUNICATION NETWORK

FIELD OF THE INVENTION

The field of the invention is that of communication between terminals within networks, and more particularly the provision of services offered by private networks to terminals connected to a public communication network.

BACKGROUND OF THE INVENTION

Many private communication networks, for example private automatic branch exchanges (PABX), offer services to the communication terminals connected to them. These services include in particular call forwarding, access to directories or databases, storage of messages, conference calls and voice or written notepads. These services are accessible to terminals when they are connected directly to their own private network, of course. However, if terminals are far away from the private network, they are able to access certain of their services only if said private network is connected to a public network via a communication server such as a gateway, and subject to particular arrangements.

One particular arrangement is assigning to certain keys of the terminal's keypad functions corresponding to particular services. Pressing one of these keys sends to the gateway a preprogrammed dual tone multifrequency (DTMF) data sequence on a public network transmission channel dedicated to the exchange of voice data. Consequently, if a user wishes to access a service when he has already set up a voice connection to another terminal, he must first of all temporarily break off his connection, then set up a connection with the server for the latter to make said service available to him, and finally re-establish the original connection to the other terminal. Moreover, during a voice connection with another user, this rules out dynamically offering the user services adapted to certain events that may arise during a call, for example a higher priority incoming call, a text message that needs to be displayed during a call, or a request to enter a conference call. Moreover, only the services associated with the preprogrammed functions may be made available to terminal users. This arrangement is therefore "static", making it ill-suited to the requirements of real time processing.

A second arrangement, described in patent application EP 1 107 523, consists first of all in setting up, on a public network transmission channel dedicated to signaling, a connection between a terminal wishing to access services of its own private network and a gateway connected to that private network, and then sending a Word Markup Language (WML) page offering its user a certain number of services to the calling terminal via the gateway. When the user has made his choice, his terminal sends to the gateway a WML command and, following specific data exchange protocol format conversion processing, the terminal is able to access the chosen service. Because the user has to make his choice from a predefined list of services, it is not possible, during a voice connection with another user, to offer the user dynamically services adapted to certain events that may arise during a call. This arrangement is therefore also "static", making it ill-suited to the requirements of real time processing.

SUMMARY OF THE INVENTION

Thus an object of the invention is to remedy some or all of the problems referred to hereinabove.

To this end it proposes a communication server installed between one or more first (public and/or private) communication networks and a second private communication network adapted to offer a multiplicity of services to terminals, said server being adapted to set up links in accordance with a selected protocol (for example the Wireless Application Protocol (WAP)), with communication terminals, for example mobile telephones, connected to one of the first networks and adapted to exchange simultaneously signaling data on a first transmission channel and voice data on a second transmission channel.

The server, which is an access gateway, for example, is characterized in that it comprises control means capable of sending to a terminal connected to the first network, on a first channel and as a function of a selected criterion, configuration data (constituting a script or an applet, for example) to enable the terminal to set up a connection with the server on the first channel, when it has already set up a voice connection on a second channel, to make available to its user, during the voice connection, at least some of the services offered by the second network to which it is connected.

The invention therefore provides the full benefit of the architecture of certain communication networks, such as GPRS and UMTS networks, in which different transmission channels are used for signaling data and content data or "media" data, in particular voice data.

The control means are preferably adapted to transmit configuration data to a terminal when the terminal has previously set up a connection with the server using a selected primary identifier, such as a dedicated telephone number. In this case, setting up this connection beforehand constitutes the selected criterion.

The control means may preferably be adapted to effect an identification procedure before sending said configuration data. In this case, the server includes a memory for storing secondary identifiers, for example the International Mobile Station Identity (IMSI), stored in the SIM card of the terminal, and the control means are adapted to send to the terminal identification data which, once installed in the terminal, automatically sends to the server at least the second identifier stored in the terminal, then compares the received secondary identifier to the identifier stored in the memory, and sends the appropriate configuration data to the terminal if the identifiers are identical. The control means may also send security data to the terminal after sending the configuration data.

The configuration data may preferably be adapted, when activated by the user, to prompt the user to enter at least one tertiary identifier, for example his password or user name, in order to send a request to register the terminal and comprising at least the tertiary identifier supplied by the user (and security data, where applicable) to the control means, also on the first channel. In this case, it is advantageous to store the primary identifiers in the memory of the server in corresponding relationship to at least one tertiary identifier (and security data, where applicable), so that on receiving a request for registration the control means may first of all send to the configuration data installed in the terminal a request to send at least the primary identifier associated with the terminal, and then compare the primary identifier and the tertiary identifier received to the identifier stored in the memory, in order to authorize or refuse registration as a function of the result of the comparison.

The configuration data may preferably be adapted to extract certain information from the message in order to send it to the control means via the first channel, doing this immediately the terminal receives a call request message from the first network and preferably when the terminal has been registered. In this case, on receiving the extracted information, the control means may process it as a function of its content, and then send a message selected as a function of the processing applied and the information received, and where applicable containing information to be displayed on the screen of the terminal, to the terminal, also on the first channel.

In the same way, and preferably after registration of the terminal, the configuration data may be adapted so as to inhibit access to the first network immediately when the user attempts to call a remote terminal and then to send to the control means information including at least the primary identifier (or telephone number) of the remote terminal, also on the first channel. In this case, on receiving the extracted information, the control means may process it as a function of its content and then send a message selected as a function of the processing applied and the information received and containing at least one authorization or prohibition to make the call, and where applicable information to be displayed on the screen of the terminal, to the terminal, also on the first channel, so that on receipt of this message the configuration data removes the inhibition on access to the first network with a view to setting up the call, or prohibits the call.

The invention also provides a method of making services offered by a second private communication network available to terminals connected to a first communication network via a communication server and in accordance with a selected protocol. The terminals are able to simultaneously exchange signaling data on a first transmission channel and voice data on a second transmission channel.

The method consists in the server sending to a terminal connected to the first network, on a first channel and as a function of a selected criterion, configuration data (constituting a script or an applet, for example) for setting up with the server a connection on the first channel during a voice connection on a second channel, in order to make at least some of the services offered by the second network to which it is connected available to the terminal during the voice connection.

The method of the invention may have many complementary features implemented separately and/or in combination, and in particular:

the configuration data may be sent to a terminal after the terminal has set up a connection with the server using a selected primary identifier; in this case, setting up this connection constitutes the selected criterion;

an identification procedure may be effected before sending the configuration data; in this case, it is preferable to store secondary identifiers beforehand in a memory of the server so that it is possible to start by sending to the terminal identification data which, once installed in the terminal, automatically sends to the server at least one secondary identifier stored in the terminal, after which this secondary identifier is compared to the identifier stored in the memory and the appropriate configuration data is sent to the terminal if the identifiers are identical;

the server may also send security data to the terminal when the configuration data has been sent to it;

the configuration data may be adapted, in the event of activation of the terminal by the user, to prompt the user to supply at least one tertiary identifier and to send to the server, on the first channel, a registration request containing at least the tertiary identifier; in this case, it is preferable to store the primary identifiers in the memory of the server in corresponding relationship to at least one tertiary identifier; accordingly, on receiving a registration request, the server sends to the configuration data a request to send at least the primary identifier associated with the terminal, after which the primary identifier and the tertiary identifier received are compared in the server to the identifier stored in its memory, in order to authorize or refuse registration as a function of the result of the comparison;

the configuration data may be adapted, in the event of reception of a call request message from the first network, and preferably after the terminal has been registered, to extract certain information from the message and send it to the server on the first channel; accordingly, on receipt of the information, it may be processed as a function of its content and then a selected message sent to the terminal, on the first channel, as a function of the processing applied and the information received, where applicable with information to be displayed on the screen of the terminal;

the configuration data may be adapted, if the terminal attempts to call a remote terminal, and preferably after the terminal has been registered, to inhibit access to the first network and to send to the server on the first channel information including at least the secondary identifier of the remote terminal; accordingly, on receipt of the information, it may be processed as a function of its content, after which there is sent to the terminal, on the first channel, a message selected as a function of the processing applied and the information received and containing at least one call authorization or prohibition and where applicable information to be displayed on the screen of said terminal, so that on receipt of this message the configuration data removes the inhibition of access to the first network with a view to setting up or prohibiting the call.

The invention also provides a communication network comprising at least one first communication network connected to at least one second private communication network via a communication server of the type described hereinabove.

The invention may be implemented in public communication networks selected from PSTN, PLMN and Internet protocol (IP) networks, and in particular in public mobile communication networks selected from GSM, GPRS and UMTS networks, and in private networks selected from PABX and residential gateways adapted to use fixed access, and wireless networks such as WLAN, Bluetooth and UMTS networks. Moreover, the invention applies very particularly to connections between a first network and a server that use the WAP or the SIP in varied formats such as the XML, WML, HTML, WTAI formats or proprietary formats.

BRIEF SUMMARY OF THE DRAWINGS

Other features and advantages of the invention will become apparent on reading the following detailed description and examining the appended drawings, in which.

The drawings constitute part of the description of the invention and may, if necessary, contribute to the definition of the invention.

DETAILED DESCRIPTION OF THE INVENTION

Figure 1:
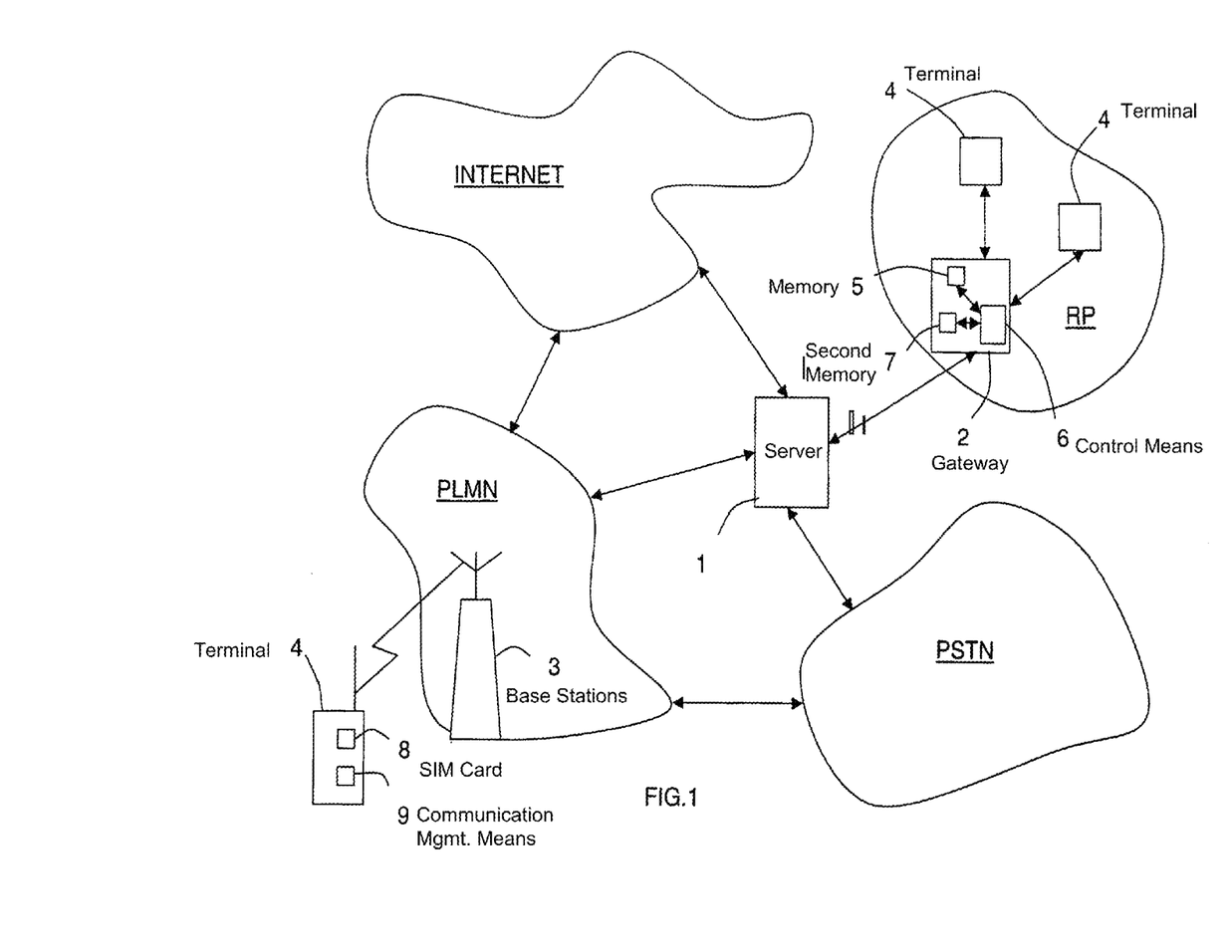
FIG. 1 shows diagrammatically one example of an installation of the invention.

The installation shown in FIG. 1 comprises a first public network (PLMN), which is a public communication network belonging to a first mobile telephone carrier and connected to a services server 1, a second public network (PSTN), which is a public communication network belonging to a second telephone carrier and connected to the main network PLMN and to said services server 1, a third public network which is an Internet type public network also connected to the main network PLMN and to the services server 1, and a private network RP connected by a gateway 2 to the services server 1.

In this example, the first and second public networks are respectively a public land mobile network (PLMN), for example a GSM network, and a public switched telephone network (PSTN). The private network is a private automatic branch exchange (PABX), for example, possibly of the wireless type (if it conforms to the DECT standard). However, the invention is not limited to these network types or to the number of networks selected, of course. To implement the invention, the installation must comprise at least one private network offering services specific to its users and one public communication network comprising a multiplicity of base stations 3 known as base transceiver stations (BTS) in a GSM (or GPRS) network and known as Nodes B in a UMTS network, with which communication terminals 4 may simultaneously exchange signaling data on a first transmission channel and voice data on a second transmission channel, in accordance with a selected protocol.

The communication terminals 4 are fixed or mobile telephones, for example, fixed or portable (micro)computers, or personal digital assistants (PDA), with which are associated primary identifiers such as telephone numbers or addresses, or any other unique identifier for setting up a connection with them. The terminals 4 belong to users of the private network RP, for example the staff of a business. The primary identifiers of the terminals 4 are therefore known to the private network RP. To be more precise, the gateway 2 includes a first memory 5 for storing the primary identifiers of the user terminals authorized to use services offered by the private network RP.

Hereinafter, and by way of example, the PLMN is a GPRS network and the selected exchange protocol is the wireless application protocol (WAP). However, other types of public network may be envisaged, of course, for example UMTS networks, and other types of protocols may be envisaged, for example SIP. Also, the terminals 4 are mobile telephones, for example.

Figure 2:
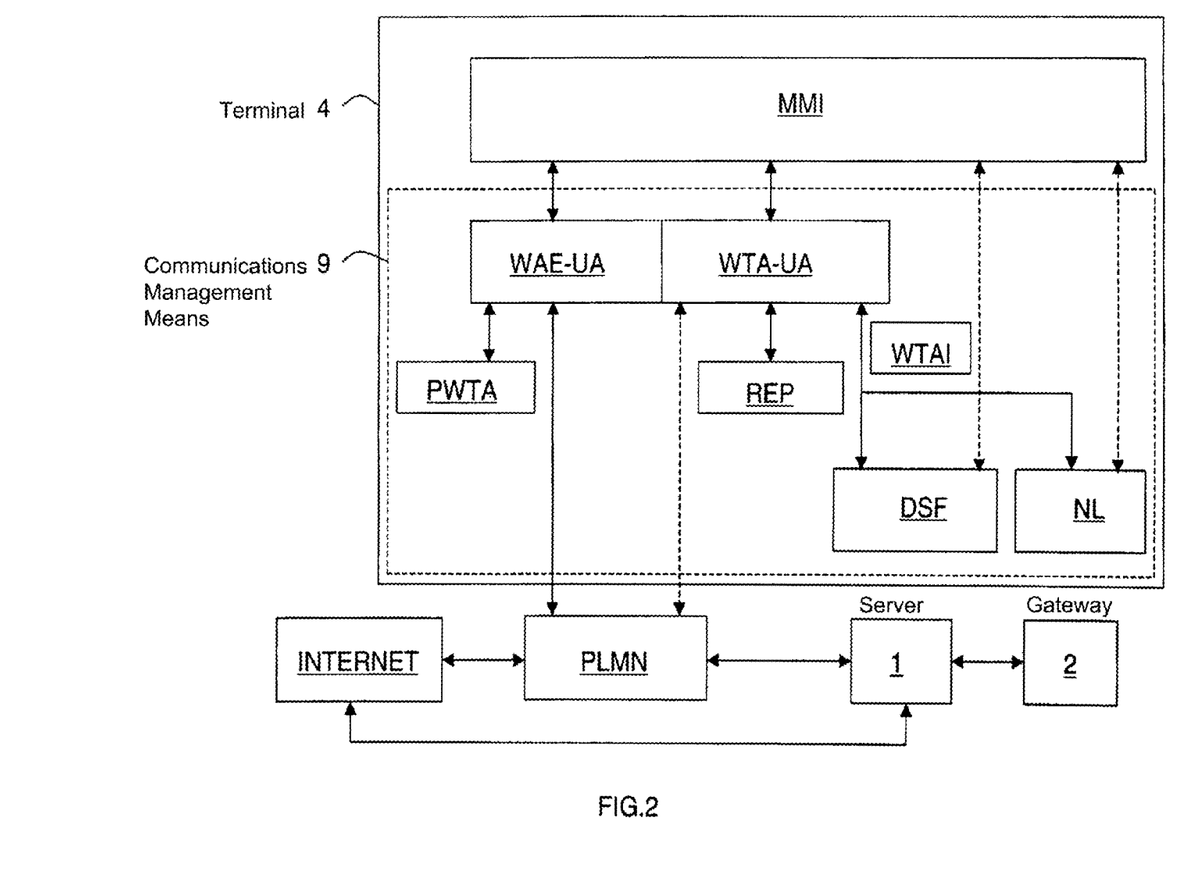
FIG. 2 is a block diagram showing connections between main functional modules of a communication terminal of the FIG. 1 installation.

The network and the protocol being very well known to the person skilled in the art, they are not described in detail here. Nevertheless, to facilitate an understanding of what follows, FIG. 2 shows the connections between the main functional modules of a WAP mobile telephone 4.

The abbreviation MMI stands for 'man-machine interface'.

The abbreviation WAE-UA stands for 'wireless application environment—user agent'. The user agent is a circuit or software for interpreting resources, such as WML or WML-Script. It may comprise a text or voice browser or a search engine.

The abbreviation WTA-UA stands for 'wireless telephony application—user agent'. The user agent is an extension of WAE-UA capable of interfacing the telephone 4 with services of the network that interact with the components of the architecture supporting WTA services.

The abbreviation WTAI stands for 'wireless telephony application interface' (WTA interface).

The abbreviation PWTA stands for 'public wireless telephony application interface.'

The abbreviation REP stands for Repository (archival storage). This (non-volatile) memory contains in particular resources (data, network objects or services identifiable by a URL) collected in the transmission channels.

The abbreviation DSF stands for 'device specific features', meaning features of the telephone 4.

The abbreviation NL stands for 'network layer'.

The units or modules designated by the abbreviations WAE-UA, WTA-UA, PWTA, WTAI, REP, DSF and NL constitute communication management means of the terminal 4.

The WTA-UA is able in particular to extract data from the memory REP and the WTAI allows the WTA-UA to interact with the functions of the mobile network (for example call set-up) and with the specific features of the mobile telephone 4 (for example use of the address book). Also, the WTA-UA receives events from the network that may relate to its content, thereby enabling dynamic telephony applications. These events received from the network are the result of actions effected by services that function within the WTA-UA. Telephony events initiated outside the mobile telephone 4 are also transmitted to the WTA-UA. This applies in particular to text messages coming from a network that are not directed to another user agent (for example events relating to the SIM card).

The WAE-UA extracts information only from external WAP servers, such as the server 1, and has access only to functions offered by WTAI public libraries (for example the call placing function).

Detailed characteristics for the above units and modules can be found at "www.wapforum.org".

The object of the invention is to enable mobile telephones 4 to access dynamically services offered by their own private network RP when they are connected to one of the public networks, for example the PLMN.

To this end, the gateway 2 of the private network RP includes a control module 6 connected to a second memory 7 storing configuration data preferably taking the form of WTA format scripts (or applets). Once installed therein, the WTA scripts assume control of the mobile telephones 4 to enable exchange of signaling data with the gateway 2 via a first transmission channel (or signaling channel).

The control module 6 is also coupled to the first memory 5, which stores a table of the correspondences between the primary identifiers of the mobile telephones authorized to access the services of the private network RP and associated secondary identifiers (see below). The control module 6 may take the form of electronic circuits, software (or data processing) modules, or a combination of circuits and software.

As indicated above, the gateway 2 is adapted to set up connections with the various networks, and in particular to exchange data on the signaling channel. Moreover, the gateway 2 is associated with a primary identifier (or address), such as a uniform resource locator (URL) enabling another server or a mobile telephone 4 to set up a connection with it.

According to the invention, if the user of a mobile telephone 4 connected to the private network RP wishes to use for the first time services offered by that network, he enters the URL of the gateway 2 into his telephone 4 in order to set up a connection therewith. Once the connection has been set up, the control module 6 of the gateway 2 sends to the mobile telephone 4, via the signaling channel, an indication of the scenario to be executed, previously stored in the terminal or sent to it, preferably a first WTA script (or configuration data) for automatically extracting from the telephone 4 one or two secondary identifiers. This first WTA script is stored in a memory area of the terminal controlled by the WTA-UA.

A preferred first secondary identifier is the user identification (IMSI) number stored in the SIM card 8 and a second preferred secondary identifier is the international mobile equipment identity (IMEI) number of the telephone stored in the terminal.

After the secondary identifier(s) have been extracted, the WTA-UA sends all or part of this information to the gateway 2 via the signaling channel. On receiving these secondary identifiers, the control module 6 compares them to the identifier stored in the correspondence table of the first memory 5. In the event of identity with the identifier stored in corresponding relationship to the primary identifier of the telephone 4, the control module extracts from the second memory 7 a second WTA script or a second script identifier previously stored in the terminal and sends it to the WTA-UA of the telephone 4 via the signaling channel. If the second WTA script is sent, it is then stored in the REP (repository) memory of the communication management means 9.

It is then preferable if the control module 6 sends security information such as a calculated authentication key to the WTA-UA of the telephone 4, via the signaling channel. The control module 6 of the gateway 2 subsequently uses this information to determine the status of the connection, even if there are no active exchanges on GPRS transmission channels.

Armed with the WTA scripts and security information, the telephone 4 is then in a position to access the services offered by its own network RP automatically, via the gateway 2. While this access may be automatic, for security reasons, the user may be required to register with the control module 6 each time he wishes to use the services.

To do this, the user must first activate the stored WTA script. The script then preferably prompts the user to furnish a tertiary identifier, for example a password and/or a user name, and then sends the tertiary identifier to the control module 6 via the signaling channel. In this case, the tertiary identifiers are also stored in the table of the first memory 5, in corresponding relationship to the primary and secondary identifiers. The script then sets up a connection with the gateway 2 via the signaling channel, in order to send it the secondary and tertiary identifiers, and where applicable security information (which may have changed simultaneously in the telephone 4 and in the gateway 2, as a result of exchanges between the gateway and the telephone).

On receipt of the secondary and tertiary identifiers, the control module 6 verifies that they correspond to those stored in the first memory 5 in corresponding relationship to the primary identifier of the telephone 4. If this is the case, the registration procedure is complete and the telephone 4 is able to use the services offered by the private network RP at any time. In other words, the script installed in the telephone 4 may, from this time on, set up a connection with the gateway 2 on the signaling channel, even if the telephone has set up a voice connection on the transmission channel dedicated to the exchange of voice data. Each time that the script sets up a connection with the gateway 2, the latter may monitor the menus and information displayed on the screen of the telephone 4 before or during calls on the voice channel and offer the user services appropriate to the circumstances, for example storage of messages, access to directories, access to voice or written notepads, conference calls, call filtering, call transfer, call broadcasting, etc.

This is all the more beneficial if the telephone has a "hands free" system and/or an operating assistant independent of voice processing.

When the user no longer wishes to access the services, he has only to deactivate the script, which sends to the control module 6 a message requesting it to cancel the registration of the telephone 4.

Once the terminal has been registered, the WTA script can act at any time. In particular, it can act following an action of the user, for example to set up a connection with a remote terminal (or server) manually or by voice control (without lifting the handset). It can also act after an action of the PLMN to which the mobile terminal 4 is connected, for example an incoming call or a conference call request or the arrival of a short message service (SMS) text message. It can also act after an action of the gateway 2, for example to display information, or on a location request, or on sending an SMS mini-message, or on event recall. It may act at its own initiative, for example to request parameters or to carry out tests or apply time delays.

Two examples of the intervention of a WTA script are described in more detail below. In these examples, the terminal 4 has been registered beforehand with the gateway 2 and the WTA script that it comprises has been activated. However, as indicated above, this registration procedure is not obligatory.

Figure 4:
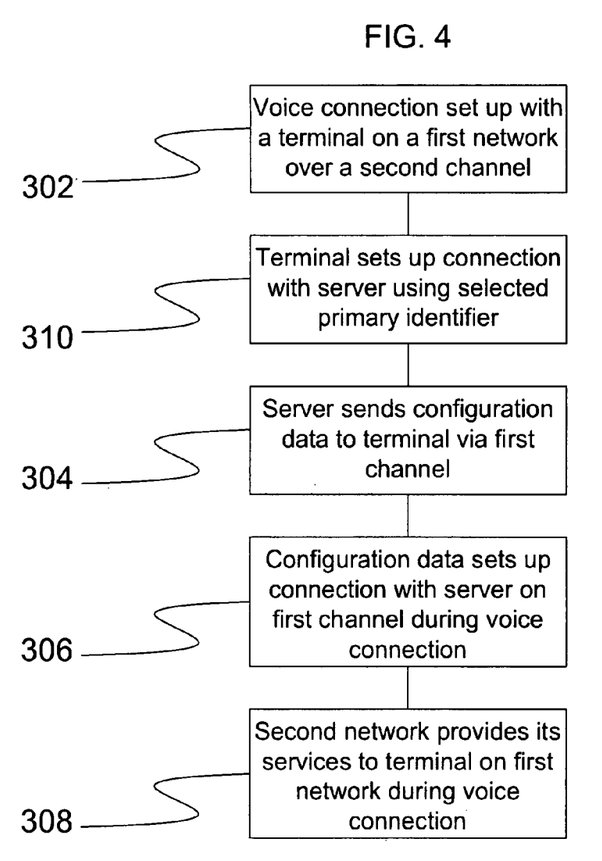
FIG. 4 is a block diagram illustrating an additional embodiment of the method of making services offered by a private second communication network available to at least one terminal connected to a first communication network, according to one aspect of the invention.
Figure 5:
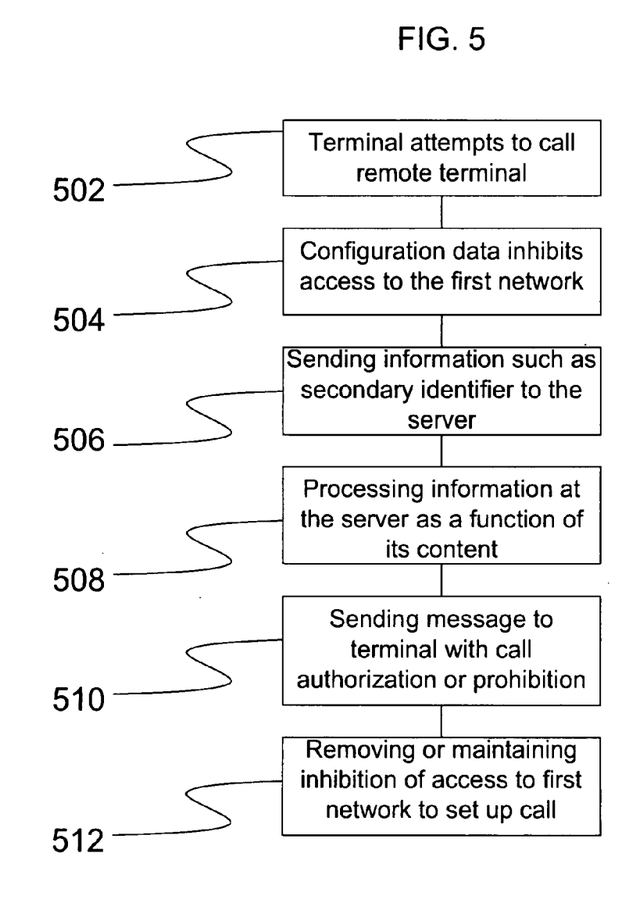
FIG. 5 is a block diagram illustrating a further embodiment of the method of making services offered by a private second communication network available to at least one terminal connected to a first communication network, according to one aspect of the invention.

A first example relates to outgoing calls from the mobile terminal 4 equipped with a WTA script, as illustrated in FIG. 4. The user first gives his terminal 4 the primary identifier of the remote terminal with which he wishes to set up a call (or connection or session) (step 502). This may be effected by voice control, selecting a name from an address book or entering a number via the keypad (or MMI). The primary identifier reaches the WTA-UA and therefore the WTA script, which inhibits access to the PLMN (step 504) and then sends to the control module 6 of the gateway 2, via the signaling channel, an information message containing at least the primary identifier designating the remote terminal that the user wishes to call (step 506). This message may also include a request to set up the call via the private network RP, for example to obtain a special rate or to communicate information specific to the business, such as the presentation of the company name.

On receipt of the information message, the control module 6 can process the data that it contains (step 508). It can in particular determine if the called party is on the private network RP (in which case the call is a local call) or not (in which case the call is an external call). It can also decide to authorize or prohibit the requested call, for example because of the type of terminal called. It can also perform the operations necessary for the call to be processed by the private network RP, for example sending ringing tone to the calling terminal 4 and ringing the called terminal, followed by setting up the connection between the two terminals. It can also place information in a call log, for example the called number, the time of the call, the call duration and the like.

When the processing is finished, the control module 6 generates a message to the mobile terminal 4 as a function of the processing applied and the information received and containing at least the authorization or prohibition of the call (step 510). This message is sent on the signaling channel and can also contain information to be displayed on the screen of the calling terminal 4 and/or the called terminal, for example the called party number or the status of the called terminal (available or busy). On receipt of this message, and if the call is not effected via the gateway 2, the WTA-UA communicates it to the WTA script which, after consulting and/or using the memory REP, either removes the inhibition on access to the PLMN with a view to setting up the call or prohibits the call (step 512), and where applicable, initiates a procedure for displaying information on the screen of the terminal 4.

Figure 6:
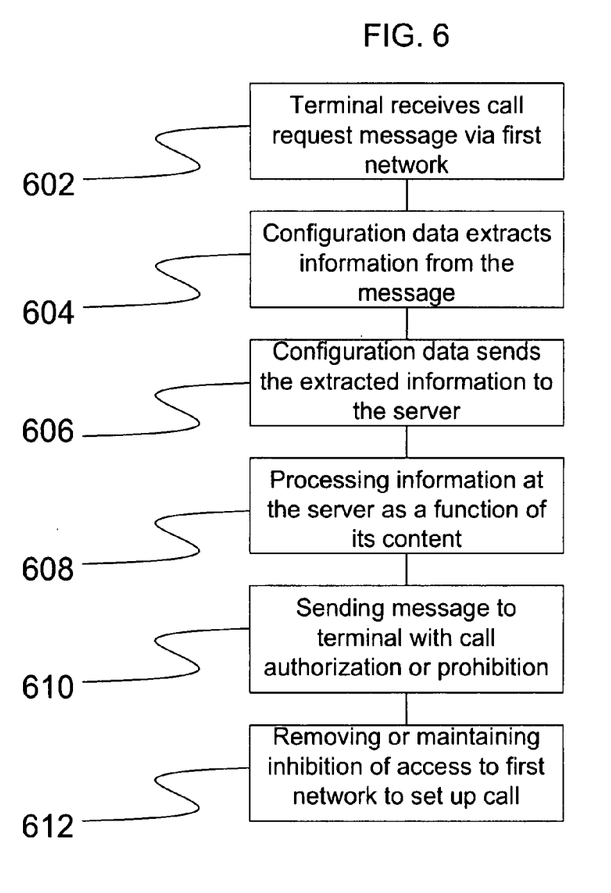
FIG. 6 is a block diagram illustrating yet another embodiment of the method of making services offered by a private second communication network available to at least one terminal connected to a first communication network, according to one aspect of the invention.

A second example concerns incoming calls via the PLMN to the mobile terminal 4 equipped with a WTA script, as illustrated in FIG. 6. As soon as the WTA-UA receives the call request message (step 602), it sends it to the WTA script which extracts from it information such as, for example, the primary identifier of the terminal of the caller (step 604), in order to send the information in the form of a message to the control module 6 via the first channel (step 606). On receipt of the extracted information, the control module 6 is able to process it (step 608). It can in particular determine if the caller is on the private network RP (in which case the call is a local call) or not (in which case the call is an external call). It can also apply filtering, for example, and decide to authorize or prohibit the requested call. It can also place information in a call log, for example the called number, the time of the call, the call duration and the like.

When the processing is finished, the control module 6 generates a message to the mobile terminal 4 as a function of the processing applied and the information received (step 610), and where applicable containing information to be displayed on the screen of the called terminal 4, for example the number and/or name of the calling party, an indication of whether the calling party is on the private network, or the characteristics of the associated ringtone. On receipt of this message, the WTA-UA communicates it to the WTA script which, after consulting and/or using the memory REP, either sets up or prohibits the call (step 612), and where applicable initiates a procedure for displaying information on the screen of the terminal 4.

Thanks to the invention, it is also possible to implement other functions dynamically because, the WTA script exchanging data with the gateway 2 via the signaling channel, the user can simultaneously conduct a dialog with a remote terminal via the voice channel. The control module 6 can therefore at any time offer the user actions or menus adapted to events that may occur during the call, on the screen of his terminal 4 and through the intermediary of the WTA script. By way of nonlimiting example, it can in particular offer the terminal 4 a higher priority incoming call, a text message that has to be displayed during the call, a request to enter a conference call, access to private databases, access to directories of the private network, an incoming call transfer, storage of messages, access to a voice or written notepad, and the like.

The invention therefore adapts the functions offered to a user dynamically, as a function of the current situation, in particular by controlling information displayed on the screen of the user's terminal before and during a call.

The invention also offers a method for making services offered by a private second communication network RP, via a communication server 2 and in accordance with a selected protocol, available to terminals 4 connected to a first communication network (PLMN) and able to exchange simultaneously signaling data and voice data on a signaling channel and a voice channel, respectively.

This method may be implemented using the device described hereinabove. The main and optional functions and subfunctions of the steps of the method being substantially identical to those of the various means constituting the installation, only the steps implementing the main functions of the method of the invention are summarized hereinafter.

Figure 3:
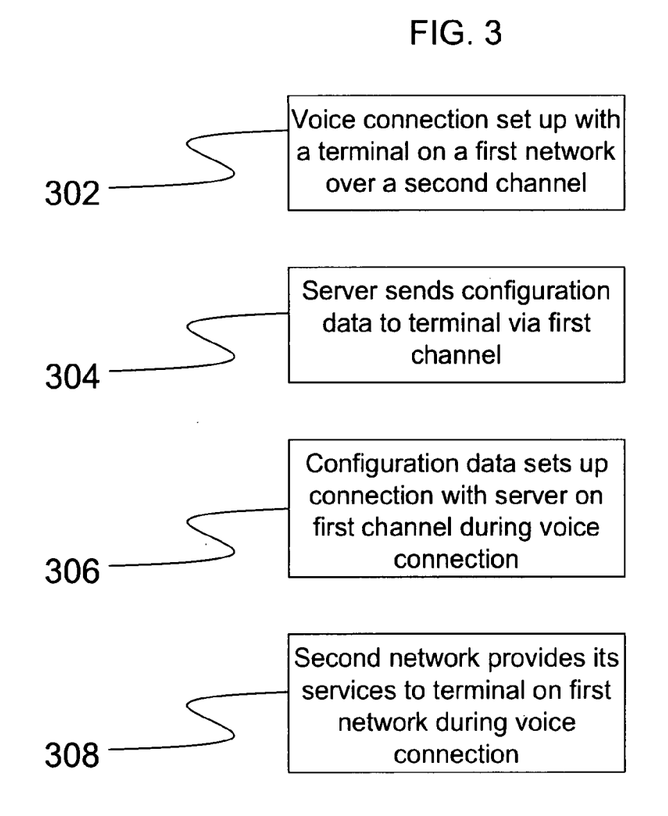
FIG. 3 is a block diagram illustrating a method of making services offered by a private second communication network available to at least one terminal connected to a first communication network, according to one aspect of the invention.

The method, as illustrated in FIG. 3, consists in having the server 2 send to a terminal 4 connected to the first network PLMN, on a first channel and as a function of a selected criterion, configuration data (step 304) (constituting a script or an applet, for example) for setting up a connection with the server 2 on the first channel (step 306), during a voice connection on a second channel (step 302), so as to make at least some of the services offered by the second network RP to which it is connected available to the terminal 4 (step 308) during the voice connection.

The configuration data may be sent to the terminal 4 after the terminal has set up a connection with the server 2 using a selected primary identifier (step 310), as illustrated in FIG. 4.

An identification procedure may be executed before transmitting the configuration data.

A procedure may be provided for registering the terminal 4 with the server 2 via the first signaling channel before making the services of the private network RP available to said terminal.

The invention is not limited to the embodiments of the method, server and installation described hereinabove by way of example only, but encompasses all variants that the person skilled in the art might envisage that fall within the scope of the following claims.

Thus reference is made above to WAP exchanges between connections between a first network and a server, but the invention applies equally to SIP and more generally to exchanges between public networks and nodes of private networks. Similarly, in terms of transport, a WLAN wireless network or a Bluetooth network may be used.

The invention claimed is:

1. A method of making services offered by a private second communication network available to at least one terminal connected to a first communication network comprising the steps of:

sending, from a communication server, configuration data via a first transmission channel to a terminal connected to a first communication network, the configuration data sent as a function of a selected criterion;

setting up a connection between the terminal connected to the first communication network and the communication server using a selected primary identifier, wherein the setting up of the connection constitutes the selected criterion, the configuration data enabling the terminal connected to the first communication network to set up the connection with the communication server on the first transmission channel during a voice connection between at least two users on a second transmission channel;

simultaneously exchanging signaling data on the first transmission channel and voice data on the second transmission channel via the communication server and in accordance with a selected protocol, wherein the second transmission channel is dedicated only to exchange of voice data, so that at least some services offered by the private second communication network are available to the terminal connected to the first communication network during the voice connection;

inhibiting access, using the configuration data, to the first communication network by the terminal connected to the first communication network;

receiving, by the server via said first transmission channel, information including at least a secondary identifier of a remote terminal in the event of an attempt by the terminal connected to the first communication network to call the remote terminal;

processing the information as a function of its contents on receipt of said information;

choosing a message as a function of said processing and said information received, wherein the message comprises at least one of a call authorization or a call prohibition and information to be displayed on the screen of the terminal; and sending the message to the terminal on said first transmission channel so that, on reception of said message, said configuration data either removes the inhibition on access to the first communication network to allow setting up the call or prohibits said call.

2. The method of claim 1, further comprising effecting an identification procedure before sending the configuration data.

3. The method of claim 2, further comprising storing secondary identifiers in a memory of the server and in that identification data is sent to the terminal connected to the first communication network that, when installed in said terminal connected to the first communication network, enables automatic transmission to said server of at least one secondary identifier stored in a memory of said terminal connected to the first communication network, after which, on reception of the secondary identifier, the secondary identifier is compared to the identifiers stored in the memory of the server and said configuration data is sent to said terminal connected to the first communication network if the identifiers are identical.

4. The method of claim 2, further comprising sending security data to the terminal connected to the first communication network after sending said configuration data.

5. The method of claim 2, wherein the secondary identifier stored in the memory of said terminal connected to the first communication network represents the user of said terminal connected to the first communication network.

6. The method of claim 2, wherein the configuration data and/or identification data constitutes a script or an applet.

7. The method of claim 1, further comprising using the configuration data, in the event of activation by the user of the terminal connected to the first communication network, to prompt said user to provide at least one tertiary identifier and to send a registration request comprising at least said tertiary identifier to said server on the first channel, in that primary identifiers are stored in said memory of the server in corresponding relationship with at least one tertiary identifier, and in that, on reception of a registration request, a request for transmission of at least the primary identifier associated with said terminal connected to the first communication network is sent to said configuration data, after which, on reception of said primary identifier, the primary identifier and the tertiary previously received are compared in the server to the identifiers stored in its memory to authorize or refuse said registration as a function of the result of this comparison.

8. The method of claim 7, further comprising using the configuration data, in the event of reception of a call request message from the first network by said terminal connected to the first communication network, to extract certain information from the call request message and to send the information to the server via the first channel, and in that, on reception of said information, the received information processed as a function of its content, after which a message selected as a function of the processing applied and the information received is sent to the terminal connected to the first communication network on said first channel, and the information received from said terminal connected to the first communication network is processed after performing a registration operation at the terminal connected to the first communication network.

9. The method of claim 1, further comprising using the configuration data, in the event of reception of a call request message from the first network by said terminal connected to the first communication network, to extract certain information from the call request message and to send the information to the server via the first channel, and in that, on reception of said information, the received information is processed as a function of its content, after which a message selected as a function of the processing applied and the information received is sent to the terminal connected to the first communication network on said first channel.

10. A communication server for making services offered by a private second communication network available to at least one terminal connected to a first communication network, the communication server comprising:

a control module comprising an electronic circuit, the control module configured for performing operations comprising:

sending configuration data via a first transmission channel to a terminal connected to the first communication network, the configuration data sent as a function of a selected criterion;

setting up a connection between the terminal connected to the first communication network and the communication server using a selected primary identifier, wherein the setting up of the connection constitutes the selected criterion, the configuration data enabling the terminal connected to the first communication network to set up a connection with the communication server on the first transmission channel during a voice connection between at least two users on a second transmission channel;

simultaneously exchanging signaling data on the first transmission channel and voice data on the second transmission channel via the communication server and in accordance with a selected protocol, wherein the second transmission channel is dedicated only to exchange of voice data, so that at least some of the services offered by the private second communication network are available to the terminal connected to the first communication network during the voice connection, inhibiting access, using the configuration data, to the first communication network by the terminal connected to the first communication network;

receiving, by the communication server via said first transmission channel, information including at least a secondary identifier of a remote terminal in the event of an attempt by the terminal connected to the first communication network to call the remote terminal;

processing the information as a function of its contents on receipt of said information;

choosing a message as a function of said processing and said information received, wherein the message comprises at least one of a call authorization or a call prohibition and information to be displayed on the screen of the terminal; and sending the message to the terminal on said first transmission channel so that, on reception of said message, said configuration data either removes the inhibition on access to the first communication network to allow setting up the call or prohibits said call.

11. The server according to claim 10, wherein the control module effects an identification procedure before sending said configuration data.

12. The server according to claim 11, further comprising a server memory in which secondary identifiers are stored and in that said control module sends to said terminal connected to the first communication network identification data which, once installed in said terminal connected to the first communication network, enables the automatic sending to said server of at least one secondary identifier stored in a memory of said terminal connected to the first communication network, and then to compare a secondary identifier received from said terminal connected to the first communication network with identifiers stored in said server memory and to send said configuration data to said terminal connected to the first communication network if the identifiers are identical.

13. The server according to claim 11, wherein the control module sends data to the terminal connected to the first communication network after said configuration data.

14. The server according to claim 11, wherein the secondary identifier stored in the memory of said terminal connected to the first communication network represents the user of said terminal connected to the first communication network.

15. The server according to claim 11, wherein the configuration data and/or identification data constitute(s) a script or an applet.

16. The server according to claim 10, wherein the configuration data, in the event of activation by the user of the terminal connected to the first communication network, prompts said user to provide at least one tertiary identifier and to send a registration request containing at least said tertiary identifier to said control module on the first channel,
wherein a memory stores primary identifiers in corresponding relationship to at least one tertiary identifier, and
wherein the control module, on the receipt of a registration request sends to said configuration data a request for the transmission of at least one primary identifier associated with said terminal connected to the first communication network, and
wherein on reception of said primary identifier, to compare the primary identifier and the tertiary identifier previously received to the identifiers stored in said memory in order to authorize or refuse said registration as a function of the result of this comparison.

17. The server according to claim 16, wherein the configuration data, in the event of reception of a call request message from the first network by said terminal connected to the first communication network, extracts certain information from said call request message and to send that information to said control module via said first channel, and in that said control module, on receipt of said information, processes it as a function of its content and then to send to said terminal connected to the first communication network on a said first channel a message selected as a function of the processing applied and the information received, and said control module processes the information received from said terminal after registering the terminal connected to the first communication network.

18. The server according to claim 10, wherein the configuration data, in the event of reception of a call request message from the first network by said terminal connected to the first communication network, extracts certain information from said call request message and sends that information to said control module via said first channel, and in that said control module will, on receipt of said information, process it as a function of its content and then to send to said terminal connected to the first communication network on said first channel a message selected as a function of the processing applied and the information received.

19. The server of claim 10, further comprising a gateway that manages information displayed on a display of the terminal connected to the first communication network during the voice connection and offers services, to the terminal connected to the first communication network, via the display, wherein the services offered are related to the circumstances of the voice connection.

20. The server of claim 10, wherein the first communication network is a public communication network.

* * * * *